United States Patent [19]

Boeckeler

[11] Patent Number: 5,275,372
[45] Date of Patent: Jan. 4, 1994

[54] MOLDING RESINS AND UV-TRANSPARENT MOLDS MADE FROM THE RESINS

[75] Inventor: Rudolph H. Boeckeler, Grafton, Wis.

[73] Assignee: Cook Composites & Polymers Co., Port Washington, Wis.

[21] Appl. No.: 918,650

[22] Filed: Jul. 21, 1992

Related U.S. Application Data

[62] Division of Ser. No. 823,830, Jan. 22, 1992.

[51] Int. Cl.$^5$ .................... B29C 35/02; B28B 7/34; B27N 3/10; C08F 26/02
[52] U.S. Cl. .................................... 249/134; 264/22; 264/257; 522/24; 522/60; 522/96; 526/301; 526/319; 526/346
[58] Field of Search ............... 526/301, 319, 346, 381; 522/24, 96, 60; 264/22, 257; 249/134

[56] References Cited

U.S. PATENT DOCUMENTS

| | | | |
|---|---|---|---|
| 3,297,745 | 1/1967 | Fekete et al. | 526/301 |
| 3,700,643 | 10/1972 | Smith et al. | 526/301 |
| 3,907,751 | 9/1975 | Knight et al. | 526/301 |
| 4,073,835 | 2/1978 | Otsuki et al. | 264/22 |
| 4,092,443 | 5/1978 | Green | 522/96 |
| 4,650,845 | 3/1987 | Hegel | 526/301 |
| 5,169,571 | 12/1992 | Buckley | 264/22 |

FOREIGN PATENT DOCUMENTS

| | | | |
|---|---|---|---|
| 051476 | 5/1982 | European Pat. Off. | C08G 18/67 |
| 064809 | 11/1982 | European Pat. Off. | C08F 299/06 |
| 2362838 | 6/1975 | Fed. Rep. of Germany | B29C 17/02 |
| 1-308417 | 12/1989 | Japan | C08F 283/00 |

*Primary Examiner*—Susan Berman
*Attorney, Agent, or Firm*—Whyte & Hirschboeck

[57] ABSTRACT

UV-transparent forming tools or molds are prepared for molding resins comprising a urethane acrylate, e.g. urethane dimethacrylate oligomer, and an alpha,beta-ethylenically unsaturated monomer, e.g., styrene, cured in the presence of a peroxide initiator. The resins are tough, durable and have a wide range of other desirable properties.

13 Claims, No Drawings

MOLDING RESINS AND UV-TRANSPARENT MOLDS MADE FROM THE RESINS

This is a divisional of copending application Ser. No. 07/823,830 filed Jan. 22, 1992.

BACKGROUND OF THE INVENTION

This invention relates to molding resins. In one aspect, the invention relates to molding resins that upon cure are transparent to ultaviolet light or radiation while in another aspect, the invention relates to molds made from these resins. In yet another aspect, the invention relates to using the UV-transparent molds to shape fiber preforms in which a UV-curable composition is used as the preform binder.

The process of making fiber preforms is greatly enhanced by using UV-curable binders rather than heat-curable binders. The former generally operates at ambient temperature and generates only a small amount of heat. The latter, by its very nature, requires elevated temperatures, often in excess of 3001 C, and thus generates a significant amount of heat. As such, processes using heat-curable binders generally generate significantly greater quantities of volatile organic compound emissions, consume significantly greater amounts of energy, and require significantly longer periods of time to rigidize the preform, than processes using Uv-curable binders.

However, processes using Uv-curable binders generally require a LTV-transparent mold or forming tool to hold the fiber reinforcement in place while the binder is curing. As here used, UV-transparent means that the mold or forming tool transmits or conducts sufficient UV radiation or light to rapidly cure the UV-curable binder. In addition to being UV-transparent, important properties of the material used in construction of the mold are formability and strength. The materials are desirably easily shaped into the geometry of the mold, and are sufficiently strong to withstand the pressures required to shape the fibers placed against their surface. Furthermore, the mold should withstand the heat generated by the source of the Uv light, e.g. a UV lamp (many UV lamps also generate infrared radiation, and thus heat), and should be resistant to photodegradation from exposure to the UV radiation used to cure the preform binder.

While many common glasses are clear, and thermoformable plastics have some of the desired properties, each of these materials is lacking in certain essential characteristics. For example, glass efficiently transmits uv radiation in the range of 330 nm to 400 nm, but fractures easily and is very difficult to form. Some thermoplastic materials, such as polycarbonate and polystyrene, can be easily formed but absorb quite strongly in the 330 to 400 nm range. Some acrylic thermoplastics have good UV transmission properties but are difficult to form, while other grades form quite well but absorb strongly any UV radiation below 370 nm. While many thermoplastic materials can be machined shaped, this process is time consuming and results in a large amount of material waste. Furthermore, many thermoplastic materials distort from the heat generated by UV lamps, or degrade upon exposure to Uv radiation.

SUMMARY OF THE INVENTION

According to this invention, UV transparent molds are prepared from molding resins comprising, in weight percent based upon the total weight of the composition:
A. At least about 25% of a urethane acrylate;
B. At least about 10% of an alpha,beta-ethylenically unsaturated monomer of three to twelve carbon atoms; and
C. A catalytic amount of a peroxide initiator.

These compositions can be molded directly into the desired shape, or they can be molded into a preliminary shape which is subsequently thermoformed or machined into the desired shape. The molds made from these compositions are not only UV-transparent, but they are also tough, durable and can possess any number of other desirable properties depending upon their particular formulation. The molds are useful as shaping tools in the manufacture of preforms in which the preform binder is curable by UV radiation.

DESCRIPTION OF THE PREFERRED EMBODIMENTS

The urethane acrylates of this invention are peroxide-curable urethane elastomers (oligomers) that are essentially fully reacted urethane polymers that contain vinyl unsaturation. Certain of these polymers are described in U.S. Pat. No. 3,297,745 to Fekete and Plant which is incorporated herein by reference. These urethane acrylates are soluble in vinyl monomers, are cured by way of a free radical mechanism, and are free of isocyanate residuals.

The urethane acrylates of this invention include diacrylates and triacrylates, and are the reaction products of aliphatic or aromatic diisocyanate and polyhydroxyl containing monomers, such as diols, glycols, and polyols. For example, these oligomers comprise the reaction product of A) at-lease one organic isocyanate compound having two reactive isocyanate groups, the compound represented by the formula OCN-R$_1$-NCO where R$_1$ is an inertly-substituted or unsubstituted divalent aliphatic, cycloaliphatic or aromatic radical of at least four carbon atoms;

B) at least one alpha,beta-ethylenically unsaturated alcohol represented by the formula

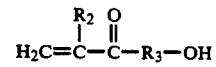

where R$_2$ is H or CH$_3$, and R$_3$ is an alkylene group or caprolactone group; and C) a glycol and/or polyhydroxy polymer.

Because aromatic radicals absorb more Uv radiation than aliphatic or cycloaliphatic radicals, R$_1$ is preferably one of the latter. By "inertly-substituted" is meant that the substituents, if any, on the divalent radical are, with the exception of alpha,beta-ethylenical unsaturation, essentially nonreactive with the alpha,beta-ethylenically unsaturated alcohol or the glycol or polyhydroxy polymer at reaction conditions.

Suitable isocyanate compounds include tolylene-2,4-diisocyanate;
2,2,4-trimethylhexamethylene-1,6-diisocyanate;
hexamethylene-1,6-diisocyanate;
diphenylmethane-4,4'-diisocyanate;

m-phenylene diisocyanate;
p-phenylene diisocyanate;
2,6-tolylene diisocyanate;
1,4-cyclohexamethylene dimethyl diisocyanate;
xylylene-1,4-diisocyanate;
xylylene-1,3-diisocyanate;
isophorone diisocyanate; and
4,4'-methylene-bis(cyclohexyl isocyanate).

Examples of alpha,beta-ethylenically unsaturated alcohols which way be employed include 2-hydroxyethyl acrylate;
3-hydroxypropyl acrylate;
2-hydroxyethyl methacrylate;
caprolactone acrylate;
caprolactone methacrylate; and
4-hydroxybutyl acrylate.
allyl alcohol The glycol and polyhydroxyl polymers include substantially all of the known monomeric alcohols having at least two hydroxyl groups, polymeric polyalkylene oxide polyols saturated polymeric polyhydroxy polyesters, and alpha,beta-unsaturated polymeric polyhydroxy polyesters such as 1,4-butane diol;
ethylene glycol;
propylene glycol;
neopentyl glycol;
polyethylene glycols;
polytetramethylene glycols;
polycaprolactone diols and triols; and
polyester diols and triols.

One representative urethane acrylate of this invention is the reaction product of four moles of isophorone diisocyanate, two moles of 1,4-butane diol, one mole of polytetramethylene ether glycol (with an average molecular weight of about 2,000), and one mole of caprolactone methacrylate. Other representative urethane acrylates are the reaction products of four moles of isophorone diisocyanate or dicyclohexyl-4,4'-methane diisocyanate with two moles of 1,4-butane diol, one mole of diethylene glycol adipate ester diol, and one mole of caprolactone methacrylate or 2-hydroxyethylmethacrylate. These and other urethane acrylates are commercially available from the Freeman Polymers Division of Cook Composites and Polymers under the trademark P-Cure. P-Cure 29-1830, P-Cure 29-1898, P-Cure XR-29-A955-40, and P-Cure XR-29-A831-04 (the first three are urethane dimethacrylate oligomers, and the fourth is a urethane triacrylate oligomer) are preferred urethane acrylates.

Any alpha,beta-ethylenically unsaturated monomer, or mixture of monomers, which acts as a reactive diluent for the urethane acrylate can be used in the practice of this invention. These compounds include mono- and polyacrylates, mono- and polymethacrylates, vinyls, acrylamides, and allylics such as ethylene glycol dimethacrylate,
1,6-hexanediol diacrylate,
tripropylene glycol diacrylate,
trimethylolpropane triacrylate,
caprolactone acrylate,
2-hydroxyl ethyl methacrylate,
methylmethacrylate,
N-vinyl-2-pyrrolidone,
styrene,
vinyl toluene,
alpha-methyl styrene,
acrylamide,
acrylonitrile,
2-ethyl hexyl methacrylate,
diallyl phthalate, and
cyclohexyl methacrylate.
methacrylic acid The preferred alpha,beta-ethylenically unsaturated monomers, of this invention are styrene and methyl methacrylate.

The peroxide free radical initiators or catalysts which are useful in a practice of this invention have half-lives of less than three hours at reaction temperature and include acyl peroxides, such as benzoyl peroxide; dialkyl or aralkyl peroxides such as di-t-butyl peroxide, dicumyl peroxide, cumylbutyl peroxide, 1,1-di-t-butyl peroxy 3,5,5-trimethylcyclohexane, 2,5-dimethyl-2,5-di-t-butyl peroxy hexane and bis (alpha-t-butyl peroxyisopropylbenzene); peroxyesters such as t-butyl peroxypivalate, t-butyl peroctoate, t-butyl perbenzoate, 2,5-dimethylhexyl-2,5-di(perbenzoate), dialkylperoxymonocarbonates and peroxydicarbonates; hydroperoxides such as t-butyl hydroperoxide, p-methane hydroperoxide, pentane hydroperoxide and cumene hydroperoxide; and ketone peroxides such as cyclohexanone peroxide and methyl ethyl ketone peroxide. These peroxides can be used alone or in combination with one another or in combination with a co-catalysts such as N,N-dimethyl-p-toluidine, N,N-dimethylaniline, N,N-diethylaniline, 2,4-pentanedione, and N,N-dimethylacetaniline, as well as metal salts such as octoates and napthenates of cobalt, manganese, vanadium, potassium, zinc, and copper. Co-catalysts are generally used in conjunction with initiators that cure at low temperatures such as methylethyl ketone peroxide or cumene hydroperoxide.

The amount of peroxide required is a calalytic amount. This amount is generally at least about 0.25% by weight based on the combined weight of the urethane acrylate and the monomer, with a preferred lower limit of about 0.5%. There is no theoretical upper limit but practical considerations, such as controlling the rate of cure and the cost of the initiator, suggest that it should not exceed about 4.0 weight percent, with a preferred upper limit of about 2.0 weight percent.

In the practice of this invention, at least about 25%, preferrably at least about 50% and more preferrably at least about 70%, of urethane acrylate, is mixed with at least about 10%, preferably at least about 20% and more preferrably at least 30% of an alpha,beta-ethylenically unsaturated monomer in the presence of a catalytic amount of peroxide initiator. The individual reaction or curing conditions are not critical to this invention and accordingly, can vary widely. For reasons of convenience and economy, the temperature and pressure are often ambient but if desired, elevated temperatures and pressures can be employed. Preferably, the components of the reaction mass are continuously agitated to insure good mixing, and the curing is performed in conventional equipment. The resin can then be cast by conventional techniques. The resins of this invention exhibit little shrinkage upon cure relative to the compositions based on very highly functional urethane acrylates, such as those taught in U.S. Pat. No. 4,650,845.

The resin prepared by the process of this invention has superior ultraviolet light transmission properties. The resin can be molded by conventional molding techniques such as resin transfer molding, open molding or sheet cast molding. The resin can easily be molded directly into the desired shape or machined to achieve the desired tolerances, or thermoformed to the desired shape. The molding resins are tough and durable, and provide a wide range of properties depending upon the composition of the particular resin.

The molds of this invention are used in the same manner as conventional molds. In one embodiment, the molds are used in the preparation of rigid, fiber reinforcement preforms for use in making fiber reinforced molded articles. This method comprises applying a layer of reinforcing fibers coated with an ultraviolet light curable composition, the composition containing a photohardenable material polymerizable under Uv light and a polymerization photoinitiator, onto a surface of a preform mold made from the molding resins of this invention, which has a configuration corresponding to at least a portion of the final molded article. The coated fibers are then exposed to UV light to cure substantially all of the composition to form an essentially rigid preform, the UV light passed through the preform mold surface. In a similar manner, the molds of this invention can be used in the method of making fiber reinforcement mats. These and other methods of preparing fiber reinforcement mat and fiber reinforcement preforms are more fully described in Applicant's co-pending application entitled "Process of Forming Fiber Reinforced Molded Plastic Articles and Preforms Therefore Using a Photosetting Binder", Ser. No. 07/609,997, filed Nov. 7, 1990, which is incorporated herein by reference.

The following examples are a illustrative of certain specific embodiments of this invention. Unless otherwise noted, all parts and percentages are by weight.

SPECIFIC EMBODIMENTS

Example 1

A peroxide curable molding composition consisting of 70 parts of a urethane dimethacrylate oligomer (P-Cure® 29-1830, a product of Cook Composites and Polymers), 30 parts of styrene monomer, and 1 part of bis-[4-t-butyl cyclohexyl-peroxydicarbonate (Akzo Chemicals, Inc., Perkadox® 16) was cast between two glass plates into a sheet measuring 12 inches by 12 inches by 0.125 inches. After curing the casting for 60 minutes at 70° C., physical properties were measured at 25° C. and the UV-visible spectrum was determined for the range 200 nm to 500 nm with a Bechman Model Du-8 Spectrophotometer. The casting was tough and durable. Physical properties are shown in Table I under the caption Resin A.

The casting gave 75–78% Uv transmission above 400 nm, 60–75% between 350–400 nm, 38–60% between 320–350 nm and 0–42% from 280–320 run. This spectrum is compared with the spectrums of other castings in Table II.

Example 2

A peroxide curable molding composition consisting of 73.0 parts urethane dimethacrylate oligomer (P-Cure® XR-29-A955-40, a product of Cook Composites and Polymers), 26 parts styrene and 1 part Perkadox® 16 was cast into a sheet and cured as in Example 1. UV transmission was in the same ranges as Example 1. Physical properties are shown in Table I under the caption Resin B.

Example 3

The cast sheet of Example I was placed over 3 layers of continuous strand glass mat which had been treated with 5% by weight of epoxy acrylate Uv curable binder (Nupol® XP-44-A908-97, a product of Cook Composites and Polymers). The binder was exposed to UV radiation from a 400 watt mercury vapor lamp through the cast sheet. After 30 seconds UV exposure, the glass mat preform was rigid and held its shape, and odor of uncured monomer was absent.

Example 4

The procedure of Example 3 was followed with the cast sheet of Example 2. The glass mat preform was rigid after 30 seconds exposure.

Example 5

The cast sheet of Example I was warmed in a 70° C. oven. After 15 minutes heating, the sheet could easily be formed using low pressure. The warm sheet was formed halfway around a 3 inch diameter cylinder. After cooling to room temperature, the sheet maintained its 3 inch arc.

Example 6

A peroxide curable molding composition consisting of 70 parts P-Cure® 19-1830, 30 parts styrene monomer, and 1 part cumeme hydroperoxide was injected into a resin transfer flat panel mold measuring 18 inches by 18 inches by 0.125 inches and was demolded after holding for 30 minutes at 150° F.

Three layers of continuous strand glass mat treated with UV-curable preform binder were exposed through the molded panel to a 400 watt per inch mercury vapor lamp manufactured by Dr. Hoenle, GMBH, Germany. After a 20 second exposure, the glass mat was rigid, non-tacky, and odor of unreacted binder could not be detected (which was indicative that-substantially all of the binder had cured).

Example 7

A peroxide curable molding composition consisting of 70 parts of a urethane triacrylate oligomer (P-Cure® XR-29-A831-04), 30 parts styrene monomer, and I part Perkadox 16 catalyst was cast into a cylindrical mold of 6 inch diameter and ¾ inch height and cured for 45 minutes at 70° C. The piece was machined to remove ½ inch and ¼ inch sections in the center and the resulting piece was used as a forming tool to shape glass fiber reinforcement treated with UV-curable binder. In this manner, 3 layers of treated glass mat were rigidized by exposure for 60 seconds to a single 400 watt/inch Hoenle UV lamp.

Example 8

The procedure of Example 7 was repeated with the composition of Example 1. After 60 sec. exposure to UV light, 3 layers of UV binder treated glass mat were rigidized to make a preform for RTM molding.

Example 9

The urethane methacryate molding composition of Example 6 was injected under low pressure into a heated resin transfer mold having cavity dimensions of 18 inches × 24 inches × 8 inches × 0.125 inch thickness.

The mold was maintained at 140° F. for 40 minutes to allow for curing of the resin.

The molded part was used as a forming tool to shape UV-curable binder treated, 1.5 ounce continuous strand glass mat for making preforms. After exposing the UV-curable binder treated glass through the urethane acrylate mold for 10 seconds to a 6000 watt UV lamp (Fusion Systems, Inc., "V" bulb), the first 6 layers of glass were 100% cured (rigidized), and the 7th layer was 60% cured (partially rigidized).

When identically treated glass mat was exposed for 10 seconds to the 6000 watt UV light through 0.125 inch thick XJVT grade acrylic sheet (a product of Rohm and Haas Company), only 5 layers of glass were 100% cured, the 6th layer 60% cured, and the 7th layer about 30% cured.

Example 10

A peroxide curable molding composition consisting of 69.3 parts by weight of P-Cure 29-1898 (a product of Cook Composites and Polymers), 29.7 parts of styrene monomer, 1 part of 2,5-dimethyl-2,5-bis(2-ethylhexanoyl peroxy) hexane (a product of Witco Chemical Co.) and 0.5 parts of polyoxydimethyl silylene (A501, a product of Byk Chemie) was cast between two pieces of plate glass separated by a 0.125 inch spacer. The casting was placed into an oven held at 50° C. for 20 minutes to remove entrapped air and then cured in a 100° C. oven for 2 hours.

A UV-visible spectrophotometric scan from 200nm to 500nm showed that this casting had 80-87% transmission above 400nm, 64-80% transmission at 350-400nm, 42-64% transmission at 320-350nm, and 0-42% transmission from 280 to 320nm. This spectrum is also compared to the spectrums of other castings in Table II.

Example 11

A peroxide curable casting composition consisting of 75 parts by weight of P-Cure 29-1830, 25 parts methyl methacrylate monomer, and I part Perkadox 16 was cast between glass plates separated by a 0.125 thick spacer. The casting was cured for 60 minutes at 70° C. The casting was tough and flexible. The physical properties are shown in Table I under Resin C.

A UV-visible spectrophotometric scan from 200-500nm showed 80-87% or greater transmission above 40ohm, 60% to 80% from 350 to 400nm, 25-60% from 320 to 350nm, and 2 to 25% from 280-320nm. This spectrum is also presented in Table II.

Table I shows that the molding resins of this invention can be formulated to have a wide range of properties such as flexibility and toughness (high elongation and relatively high tensile, resins A and C) or stiffness (high modulus, resin B) or impact resistance (unnotched impact, resin A).

These physical properties are similar or exceed those of conventional molding materials of which the thermoformed acrylic UVT is representative.

TABLE II

COMPARISON OF SPECTRAL TRANSMISSIONS OF VARIOUS FORMING TOOL MOLDING MATERIALS USED TO MAKE UV CURE PREFORM BINDERS
% TRANSMISSION

| Spectral Range | | UVT* | UVA* | Resin of Exp. 1 | Resin of Exp. 10 | Resin of Exp. 11 |
|---|---|---|---|---|---|---|
| >400 | nm | 90-93 | 92 | 75-78 | 80-87 | 80-83 |
| 350-400 | nm | 90-93 | 0-92 | 60-75 | 64-80 | 60-80 |
| 320-350 | nm | 87-90 | 0 | 38-60 | 42-64 | 25-60 |
| 280-320 | nm | 0-87 | 0 | 0-38 | 0-42 | 2-25 |

*UVT and UVA are different grades of Plexiglas ® acrylic manufactured by Rohm & Haas. The UVA demonstrates good thermoform properties but transmits UV radiation over a limited spectral range. UVT demonstrates relatively poor thermoformability but transmits UV radiation over a greater spectral range.

Although the invention has been described in considerable detail through the preceding specific embodiments, this detail is provided for the purpose of illustration only. Many variations and modification can be made by one skilled in the art without departing from the spirit and scope of the invention.

What is claimed is:

1. A UV-transparent mold made from a liquid molding resin comprising in weight percent based on the total weight of the resin:
   (A) at least about 25% of a urethane acrylate with selected from the group consisting of urethane diacrylates and triacrylates;
   (B) at least about 10% of an alpha,beta-ethylenically unsaturated monomer of three to twelve carbon atoms; and
   (C) a catalytic amount of a peroxide initiator.

2. The mold of claim 1 in which the molding resin comprises at least about 50 wt % of the urethane acrylate, and at least about 20 wt % of the alpha,beta-ethylenically unsaturated monomer.

3. The mold of claim 2 in which the urethane acrylate is a reaction product of:
   (A) at least one organic isocyanate compound having two reactive isocyanate groups, the compound represented by the formula OCN—$R_1$—NCO where $R_1$ is an inertly-substituted or unsubstituted

TABLE I

PHYSICAL PROPERTIES OF PEROXIDE CURABLE MOLDING RESINS AND PLEXIGLAS ® UVT GRADE ACRYLIC

| | (Prior Art) Thermoformed acrylic UVT | Resin A | Resin B | Resin C |
|---|---|---|---|---|
| TENSILE (PSI) | 9,388 | 7,322 | 11,775 | 7,938 |
| TENSILE MODULUS (PSI) | 370,211 | 283,828 | 506,388 | 298,504 |
| TENSILE ELONGATION (PSI) | 3.6 | 18.3 | 3.0 | 22.7 |
| UNNOTCHED IMPACT (LBS/IN) | 4.9 | 12.0 | 1.8 | 5.6 |
| NOTCHED IMPACT (LBS/IN) | 0.3 | 0.4 | 0.5 | 0.5 | divalent aliphatic or cycloaliphatic radical of at least four carbon atoms;

(B) at least one alpha,beta-ethylenically unsaturated alcohol represented by the formula

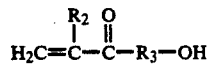

where $R_2$ is H or $CH_3$, and $R_3$ is an alkylene group or caprolactone group; and (C) at least one of a glycol or polyhydroxy polymer.

4. The mold of claim 3 in which the organic isocyanate compound used to prepare the urethane acrylate is selected from the group consisting of 2,2,4-trimethylhexamethylene-1,6-diisocyanate; hexamethylene-1,6-diisocyanate; 1,4-cyclohexamethylene dimethyl diisocyanate; isophorone diisocyanate; and 4,4'-methylenebis(cyclohexyl isocyanate).

5. The mold of claim 4 in which the alpha,beta-ethylenically unsaturated alcohol component of the urethane acrylate is selected from the group consisting of 2-hydroxyethyl acrylate; 3-hydroxyethyl acrylate; 2-hydroxyethyl methacrylate; caprolactone acrylate; caprolactone methacrylate; and 4-hydroxybutyl acrylate.

6. The mold of claim 5 in which the glycol or polyhydroxyl polymer component of the urethane acrylate is selected from the group consisting of 1,4-butane diol; ethylene glycol; propylene glycol; neopentyl glycol; polyethylene glycols; polytetramethylene glycols; polycaprolactone diols and triols; and polyester diols and triols.

7. The mold of claim 6 in which the alpha,beta-ethylenically unsaturated monomer is selected from the group of styrene, methyl methacrylate, and a mixture of the two.

8. The mold of claim 3 in which the alpha,beta-ethylenically unsaturated monomer is selected from the group consisting of mono- and polyacrylates, mono- and polymethacrylates, vinyls, acrylamides, and allylics.

9. The mold of claim 8 in which the alpha,beta-ethylenically unsaturated monomer is selected from the group consisting of ethylene glycol dimethacrylate, 1,6-hexanediol diacrylate, tripropylene glycol diacrylate, trimethylolpropane triacrylate, caprolactone acrylate, 2-hydroxyl ethyl methacrylate, methyl methacrylate, N-vinyl-2-pyrrolidone, styrene, vinyl toluene, alpha-methyl styrene, acrylamide, acrylonitrile, 2-ethyl hexyl methacrylate, diallyl phthalate, and cyclohexyl methacrylate.

10. The mold of claim 8 in which the peroxide initiator is selected from the group consisting of acyl peroxides, dialkyl or aralkyl peroxides; peroxyesters; hydroperoxides, and ketone peroxides.

11. The mold of claim 10 in which the peroxide initiator is present in an amount of at least about 0.25 wt % based on the combined weight of the urethane acrylate and the alpha,beta-ethylenically unsaturated monomer.

12. The mold of claim 11 in which the peroxide initiator is used in combination with a co-catalyst.

13. The mold of claim 12 in which the co-catalyst is selected from the group consisting of N,N-dimethyl-p-toluidine, N,N,-dimethylaniline, N,N-diethylaniline, 2,4-pentanedione, N,N-dimethylacetaniline, and metallic salts.

* * * * *